United States Patent
Sone et al.

(10) Patent No.: US 10,069,286 B2
(45) Date of Patent: Sep. 4, 2018

(54) INSULATION STRUCTURE FOR SPLICE PORTION, HARNESS MOUNTING PLATE, AND WIRING UNIT

(71) Applicants: AutoNetworks Technologies, Ltd., Yokkaichi, Mie (JP); Sumitomo Wiring Systems, Ltd., Yokkaichi, Mie (KE); SUMITOMO ELECTRIC INDUSTRIES, LTD., Osaka-shi, Osaka (JP)

(72) Inventors: Kosuke Sone, Mie (JP); Tetsuji Tanaka, Mie (JP); Osamu Nakayama, Mie (JP); Tomohide Maki, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/529,834

(22) PCT Filed: Nov. 25, 2015

(86) PCT No.: PCT/JP2015/083027
§ 371 (c)(1),
(2) Date: May 25, 2017

(87) PCT Pub. No.: WO2016/088618
PCT Pub. Date: Jun. 9, 2016

(65) Prior Publication Data
US 2017/0264088 A1    Sep. 14, 2017

(30) Foreign Application Priority Data
Dec. 3, 2014 (JP) .................. 2014-244631

(51) Int. Cl.
*H02G 3/04* (2006.01)
*H01R 4/20* (2006.01)
(Continued)

(52) U.S. Cl.
CPC .......... *H02G 3/04* (2013.01); *B60R 16/0215* (2013.01); *H01R 4/20* (2013.01); *H02G 3/045* (2013.01);
(Continued)

(58) Field of Classification Search
CPC ...... H02G 3/04; H02G 3/045; B60R 16/0215; H01R 4/20
(Continued)

(56) References Cited

U.S. PATENT DOCUMENTS 3,715,459 A * 2/1973 Hoffman .............. H02G 15/113
                                            174/138 F
3,916,086 A * 10/1975 Gillemot ............. H02G 15/003
                                            174/138 F
(Continued)

FOREIGN PATENT DOCUMENTS

JP   H08171944 A   7/1996
JP   2009295333 A  12/2009
(Continued)

OTHER PUBLICATIONS

International Search Report for Application No. PCT/JP2015/083027 dated Feb. 2, 2016, 5 pages.
(Continued)

*Primary Examiner* — Timothy Thompson
*Assistant Examiner* — Michael F McAllister
(74) *Attorney, Agent, or Firm* — Reising Ethington, P.C.

(57) ABSTRACT

An insulation structure for a splice portion, a harness mounting plate, and a wiring unit that are capable of reducing labor-hours that are required when insulating a splice por-
(Continued)

tion where a plurality of electrical wires are connected by a splice terminal. A plurality of electrical wires are connected by a splice terminal, wherein an opening portion that allows the splice portion to be inserted thereinto and removed therefrom is formed in a splice housing portion that surrounds and insulates the splice portion, and the insulation structure is provided with a separation restricting portion that restricts the splice portion that is housed in the splice housing portion from becoming separated from the opening portion.

5 Claims, 6 Drawing Sheets (51) Int. Cl.
B60R 16/02 (2006.01)
H01R 4/70 (2006.01)
(52) U.S. Cl.
CPC ............ *H02G 3/0487* (2013.01); *H01R 4/70* (2013.01); *H01R 2201/26* (2013.01)
(58) Field of Classification Search
USPC ...................................... 174/70 C
See application file for complete search history.

(56) References Cited

U.S. PATENT DOCUMENTS

| | | | | | |
|---|---|---|---|---|---|
| 4,795,857 | A | * | 1/1989 | McInnis | H01R 13/52 174/138 F |
| 5,587,556 | A | * | 12/1996 | Yamamoto | H01R 4/22 174/138 F |
| 5,594,210 | A | * | 1/1997 | Yabe | H01R 4/70 174/76 |
| 5,606,150 | A | * | 2/1997 | Radliff | H01R 4/646 174/92 |
| 7,341,479 | B2 | * | 3/2008 | Boutin | H01R 13/447 174/138 F |
| 2013/0269970 | A1 | | 10/2013 | Hara | |
| 2016/0031390 | A1 | | 2/2016 | Kawashima | |

FOREIGN PATENT DOCUMENTS

WO WO2012098705 A1 7/2012
WO WO2014156590 A1 10/2014

OTHER PUBLICATIONS

International Preliminary Report on Patentability for Application No. PCT/JP2015/083027, 8 pages.

* cited by examiner

INSULATION STRUCTURE FOR SPLICE PORTION, HARNESS MOUNTING PLATE, AND WIRING UNIT

CROSS REFERENCE TO RELATED APPLICATIONS

This application claims the priority of Japanese patent application JP2014-244631 filed on Dec. 3, 2014, the entire contents of which are incorporated herein.

TECHNICAL FIELD

The present invention relates to an insulation structure for a splice portion, a harness mounting plate, and a wiring unit.

BACKGROUND ART

There are conventionally known technologies for connecting a plurality of electrical wires using a splice terminal (for example, the disclosure in Patent Document 1 JP 2009-295333A). A splice terminal is formed by performing stamping or the like on a metal plate member. In order to connect a plurality of electrical wires using a splice terminal, the coatings of the electrical wires are partially removed such that conductors are exposed, the exposed portions are arranged in the splice terminal, and the splice terminal is crimped onto the exposed conductors. A splice portion that is connected in this way is subjected to insulation treatment such as covering the splice portion with an insulation tube and fixing the insulation tube using a tie band, or covering the slice portion with a heat shrink tube.

SUMMARY

However, insulation treatment as described above involves a lot of labor-hours. For example, it is necessary to perform the task of covering the splice portion with an insulation tube and the task of fastening a tie band, or it is necessary to perform the task of covering the splice portion with a heat shrink tube and the task of applying heat to and shrink the heat shrink tube. Therefore, there is demand for a solution.

The present design has been completed based on the above-described situation, and aims to provide an insulation structure for a splice portion, a harness mounting plate, and a wiring unit that are capable of reducing labor-hours that are required when insulating a splice portion where a plurality of electrical wires are connected by a splice terminal.

An insulation structure for a splice portion according to the present design is an insulation structure for a splice portion where a plurality of electrical wires are connected by a splice terminal. An opening portion that allows the splice portion to be inserted thereinto and removed therefrom is formed in a splice housing portion that surrounds and insulates the splice portion, and the insulation structure is provided with a separation restricting portion that restricts the splice portion that is housed in the splice housing portion from becoming separated from the opening portion, and the insulation structure is provided with an electrical wire housing portion that is formed to be narrower in width than the splice housing portion and houses electrical wires.

A harness mounting plate according to the present design is a harness mounting plate that is formed using an insulative material and includes: a splice holding portion that includes: a splice housing portion that includes an opening portion that allows a splice portion where a plurality of electrical wires are connected by a splice terminal to be inserted thereinto and removed therefrom, and surrounds and insulates the splice portion; a separation restricting portion that restricts the splice portion that is housed in the splice housing portion from becoming separated from the opening portion; and an electrical wire housing portion that is formed to be narrower in width than the splice housing portion and houses the electrical wires; and a harness mounting portion on which a wire harness that includes the electrical wires is to be mounted, wherein the splice holding portion is provided as a portion of the harness mounting plate.

A wiring unit according to the present design is a wiring unit that includes: a wire harness that includes the electrical wires; and the harness mounting plate.

According to the present design, it is possible to hold and insulate the splice portion within the splice housing portion by simply performing the task of housing the splice portion in the splice housing portion. Therefore, it is possible to reduce labor-hours that are required when insulating the splice portion, compared to cases where a tube, a tie band, or the like is used.

DESCRIPTION OF EMBODIMENTS

The following describes preferred embodiments of the present design.

The insulation structure for the splice portion may be provided with an electrical wire housing portion that is formed to be narrower in width than the splice housing portion and houses the electrical wires. With such a configuration, it is possible to restrict the electrical wires from swinging, and thus it is possible to prevent the electrical wires from breaking in the vicinity of a base of the splice terminal.

Also, in the insulation structure for the splice portion, the electrical wire housing portion may be provided with a coating pressing portion that presses coatings of the electrical wires. With such a configuration, the electrical wires are pressed by the coating pressing portion, and therefore it is possible to more reliably prevent the electrical wires from breaking in the vicinity of the base of the splice terminal.

Also, the harness mounting plate may be attached to an automatic transmission.

Embodiment

The following describes a specific embodiment in detail with reference to FIGS. 1 to 6.

A wiring unit U according to the present embodiment is attached to a device 40 (a control unit 40 for an automatic transmission in the present embodiment) that is mounted on a vehicle, and performs some of the control related to transmission operations. The device 40 includes a plurality of solenoid valves 41 (three valves in the present embodiment), and device side connectors 42 are respectively provided on upper parts of the solenoid valves 41.

The wiring unit U includes a wire harness 10 and a harness mounting plate 20 on which the wire harness 10 is mounted.

Figure 2:
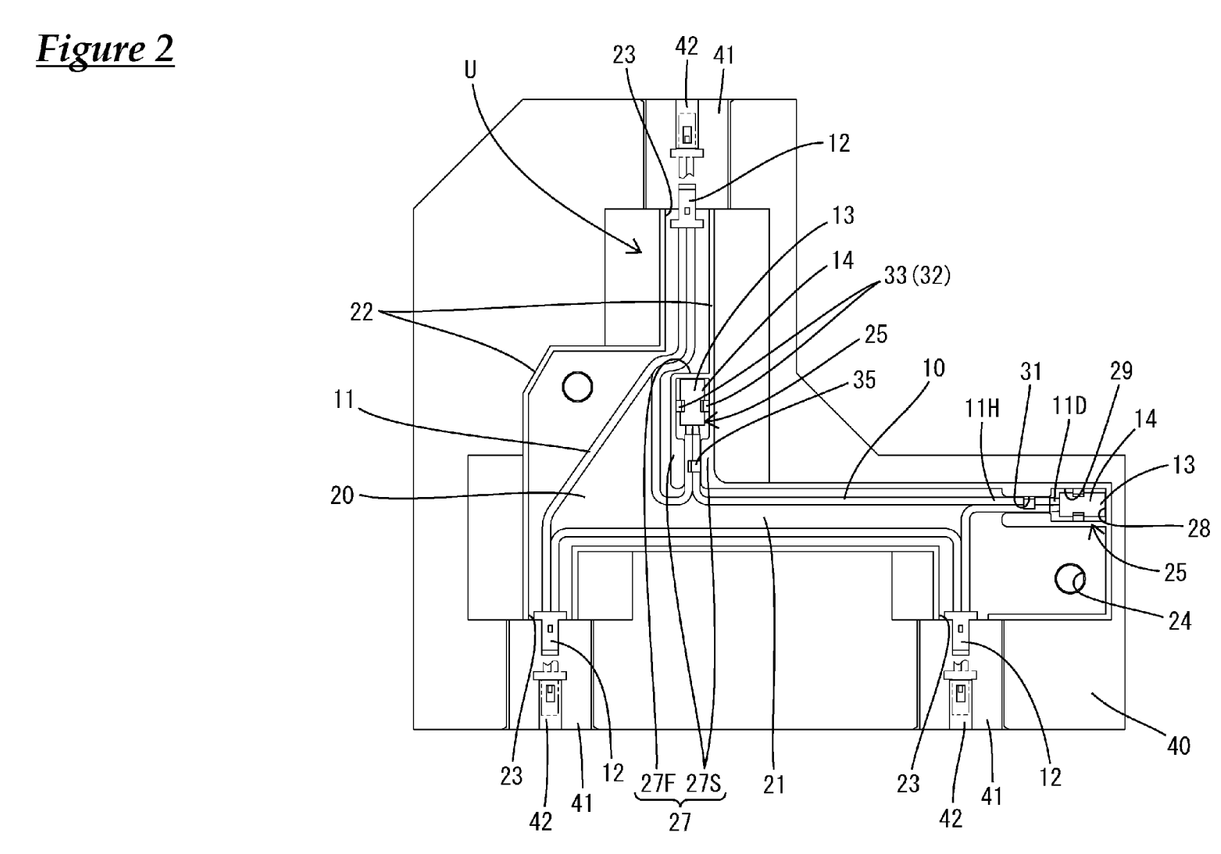
FIG. 2 is a plan view showing a wiring unit in a state of being installed to the device.

As shown in FIG. 2, the wire harness 10 includes a plurality of electrical wires 11, and a plurality of electrical wire side connectors 12 that are connected to terminal portions of the electrical wires 11 and are thus connected to the device side connectors 42. The plurality of electrical wires 11 are connected by splice terminals 13. Coatings 11H have been removed from terminal portions of the electrical wires 11 where the electrical wires 11 are connected by the splice terminals 13. The terminal portions have been inserted into the splice terminals 13 that each have a tubular shape, from the same direction, and the splice terminals 13 have been crimped.

The harness mounting plate 20 is formed using an insulative material such as a synthetic resin so as to have a predetermined shape, and a large portion of the harness mounting plate 20 is a harness mounting portion 21 on which the wire harness 10 is to be mounted.

A harness wall portion 22 is provided so as to stand on an outer edge portion of the harness mounting plate 20 to hold the wire harness 10 on the harness mounting plate 20. The harness wall portion 22 has the shape of a wall that continuously extends along the outer edge of the harness mounting plate 20, and openings 23 for allowing the electrical wire side connectors 12 to be led out of the harness mounting plate 20 are provided in portions of the harness wall portion 22 that correspond to the solenoid valves 41.

Also, bolt insertion holes 24 are formed penetrating the harness mounting plate 20, respectively at a plurality of positions of the harness mounting plate 20, and the wiring unit U is fixed to the device 40 using bolts or the like (not shown).

The harness mounting plate 20 is provided with splice holding portions 25 that hold splice portions 14 of the plurality of electrical wires 11 that are connected by the splice terminals 13 (portions that include the splice terminals 13 and exposed portions of conductors 11D of the electrical wires 11 thus connected).

As shown in FIG. 2, the splice holding portions 25 are respectively provided at a plurality of positions of the harness mounting plate 20 (two positions in the present embodiment), and each is provided in a dead space as a portion of the harness mounting plate 20. Note that the two splice holding portions 25 are provided in orientations that are different from each other by approximately 90 degrees.

Figure 1:
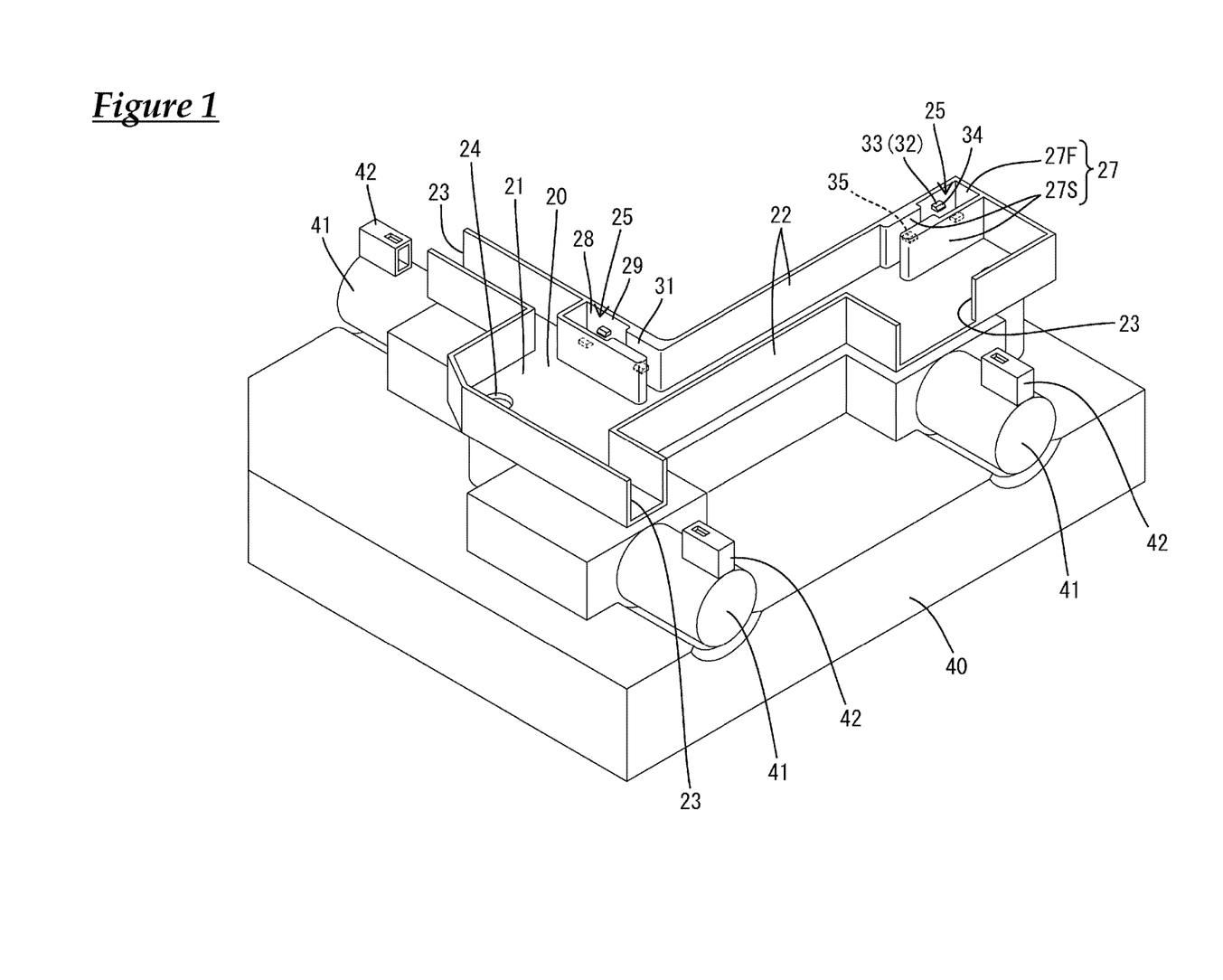
FIG. 1 is a perspective view showing a harness mounting plate according to an embodiment, which is in a state of being installed to a device.
Figure 4:
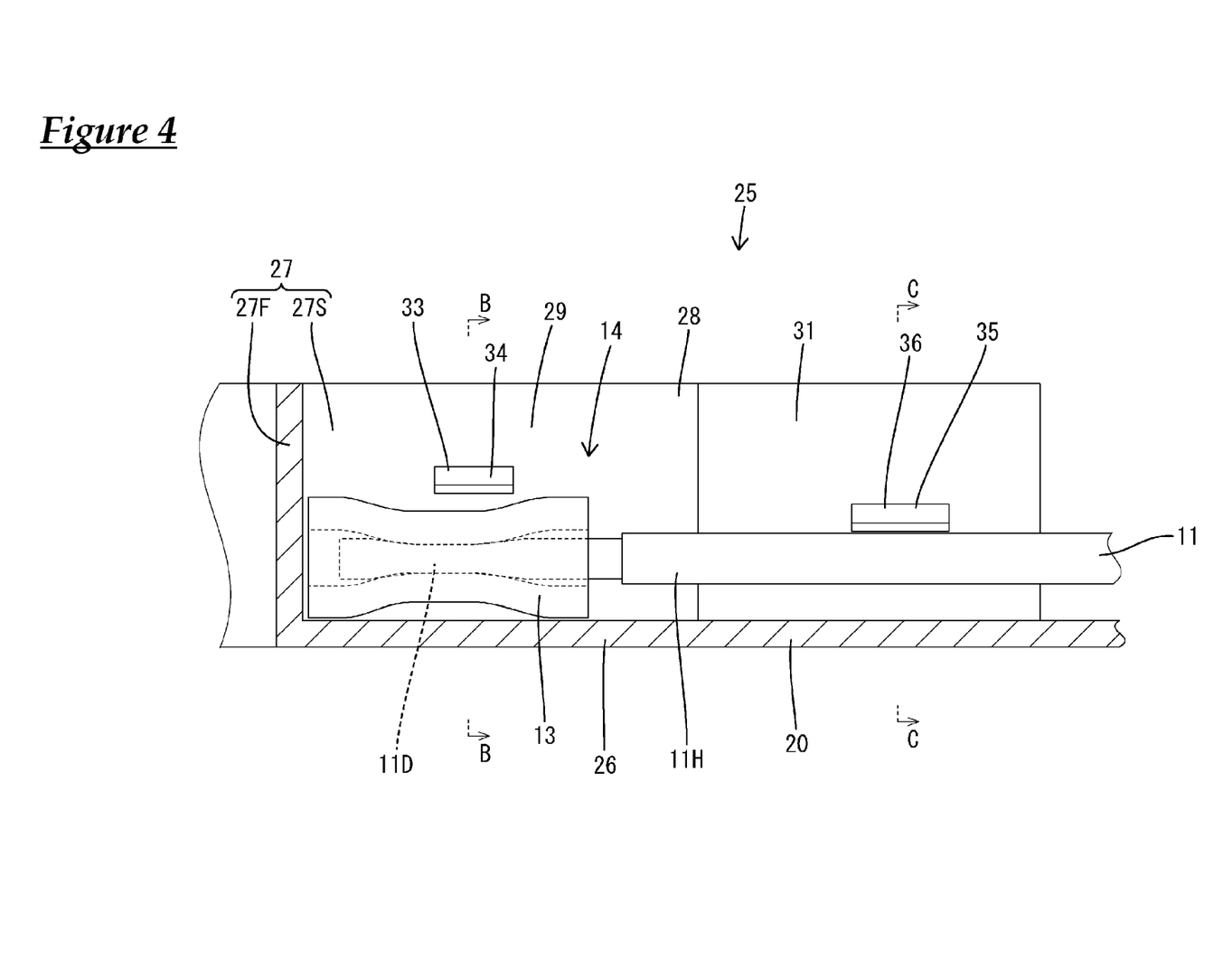
FIG. 4 is a cross-sectional view showing an insulation structure for a splice portion, and is a cross-sectional view corresponding to a cross section at an A-A position in FIG. 3.
Figure 5:
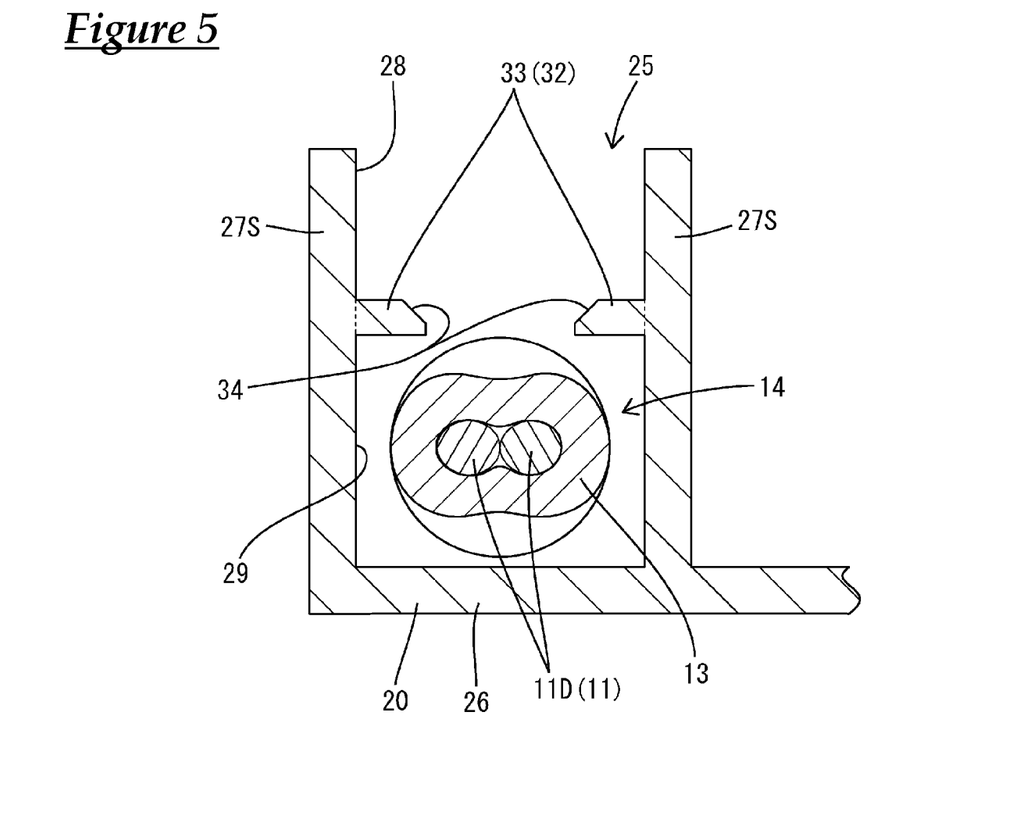
FIG. 5 is a cross-sectional view showing the insulation structure for the splice portion, and is a cross-sectional view corresponding to a cross section at a B-B position in FIG. 4.

The splice holding portions 25 respectively include insulation structures for the splice portions 14. As shown in FIGS. 4 and 5, each splice holding portion 25 includes a bottom wall 26, and peripheral walls 27 that stand on the bottom wall 26. The peripheral walls 27 include a front wall portion 27F that stands on the front side of a splice terminal 13 (on the side that is opposite the side to which the electrical wires 11 are led out), and a pair of side wall portions 27S that stand on both sides of a splice terminal 13 in the width direction, and these wall portions stands in a substantially vertical direction relative to the bottom wall 26. As shown in FIG. 1, the height of the peripheral walls 27 is substantially equal to the height of the harness wall portion 22, and portions of the harness wall portion 22 serve as portions of the peripheral walls 27 of the splice holding portions 25. Note that the height of the peripheral walls 27 is significantly larger than the height of the splice terminals 13 (see FIG. 4).

The splice holding portions 25 are substantially entirely open on the upper surface side so as to form opening portions 28 that allow the splice portions 14 to be inserted thereinto and removed therefrom.

Figure 3:
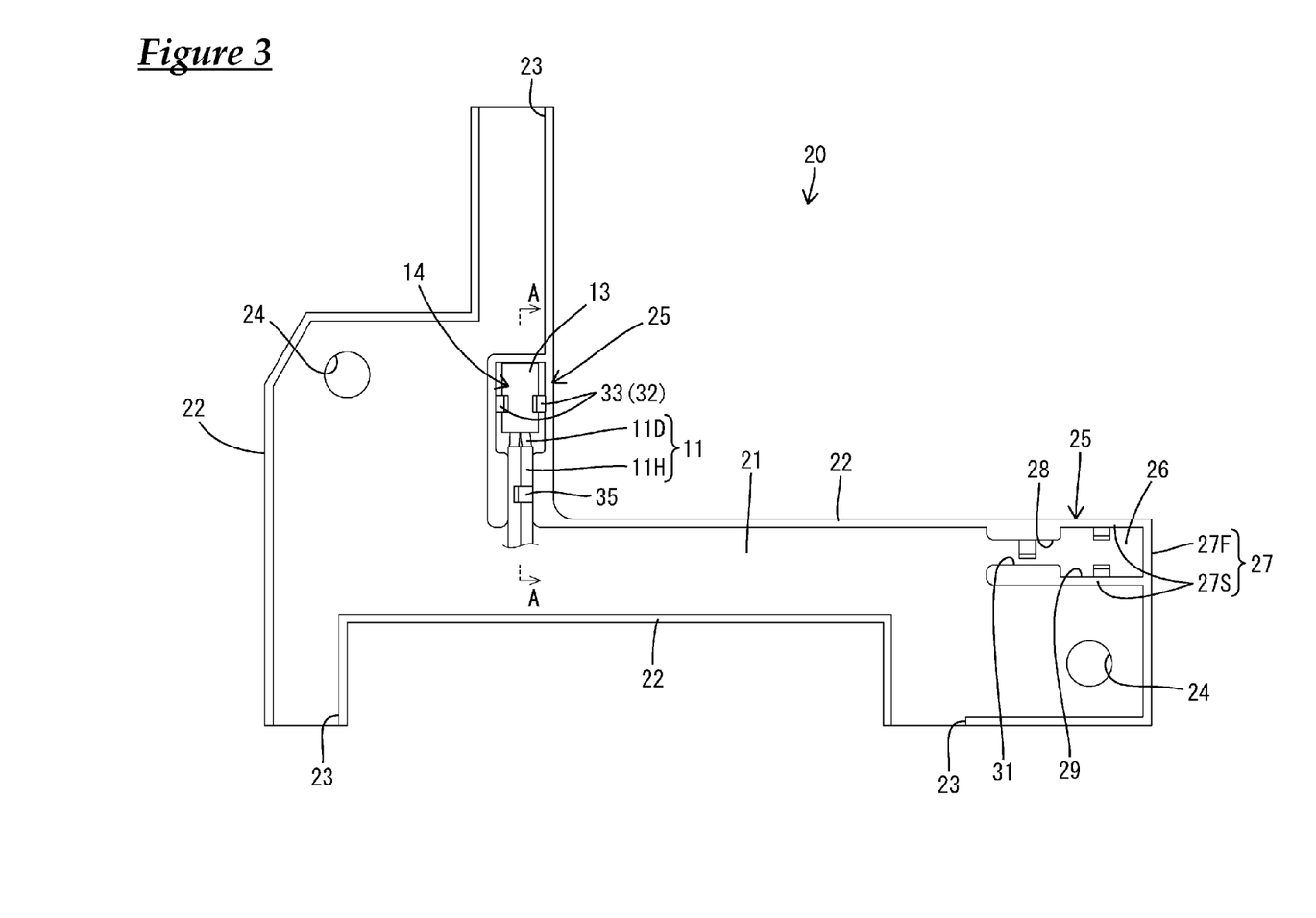
FIG. 3 is a plan view showing the harness mounting plate.

As shown in FIG. 3, each splice holding portion 25 is elongated in one direction (the direction in which the electrical wires 11 are led out of a splice terminal 13). In the longitudinal direction of each splice holding portion 25, approximately half on one end side is a splice housing portion 29 that surrounds and insulates a splice portion 14, and approximately half on the other end side is an electrical wiring housing portion 31 that houses portions of the electrical wires 11.

Each splice housing portion 29 has a rectangular shape in plan view and has a sufficient size to house a splice terminal 13. The pair of side wall portions 27S in each electrical wiring housing portion 31 have a thickness that is greater than the thickness of the pair of side wall portions 27S in the splice housing portions 29, and thus each electrical wiring housing portion 31 is formed so as to be narrower than the splice housing portions 29. Each electrical wiring housing portion 31 is formed so as to extend straight in the longitudinal direction from a substantial midpoint of the splice housing portion 29 in the width direction (the lateral direction). Note that the width of the electrical wiring housing portions 31 is substantially equal to the width of two electrical wires 11 that are arranged next to each other.

As shown in FIG. 5, each splice housing portion 29 is provided with a separation restricting portion 32 that restricts the splice portion 14 that is housed in the splice housing portion 29 from becoming separated from the opening portion 28.

The separation restricting portion 32 is located above the splice terminal 13 that is housed in the splice housing portion 29, and is configured such that the opening portion 28 partially narrows.

The separation restricting portion 32 includes a pair of terminal pressing portions 33 that are provided so as to respectively protrude from the pair of side walls. The pair of terminal pressing portions 33 are formed so as to have a symmetrical shape relative to the midpoint of the splice housing portion 29 in the lateral direction. End edge portions of the pair of terminal pressing portions 33 are respectively provided with guiding portions (hereinafter referred to as first guiding portions 34) that guide the splice portion 14 into the splice housing portion 29. The first guiding portions 34 are inclined surfaces that are formed on the upper surface side of the end edge portions of the terminal pressing portions 33, and are inclined downward toward the end edges (toward the midpoint of the splice housing portion 29 in the lateral direction). As shown in FIG. 3, the pair of terminal pressing portions 33 are provided at substantial midpoints of the splice housing portion 29 in the longitudinal direction, and are configured to press substantial midpoints of the splice terminal 13 in the longitudinal direction from above when the splice terminal 13 is about to become separated from the opening portion 28.

Figure 6:
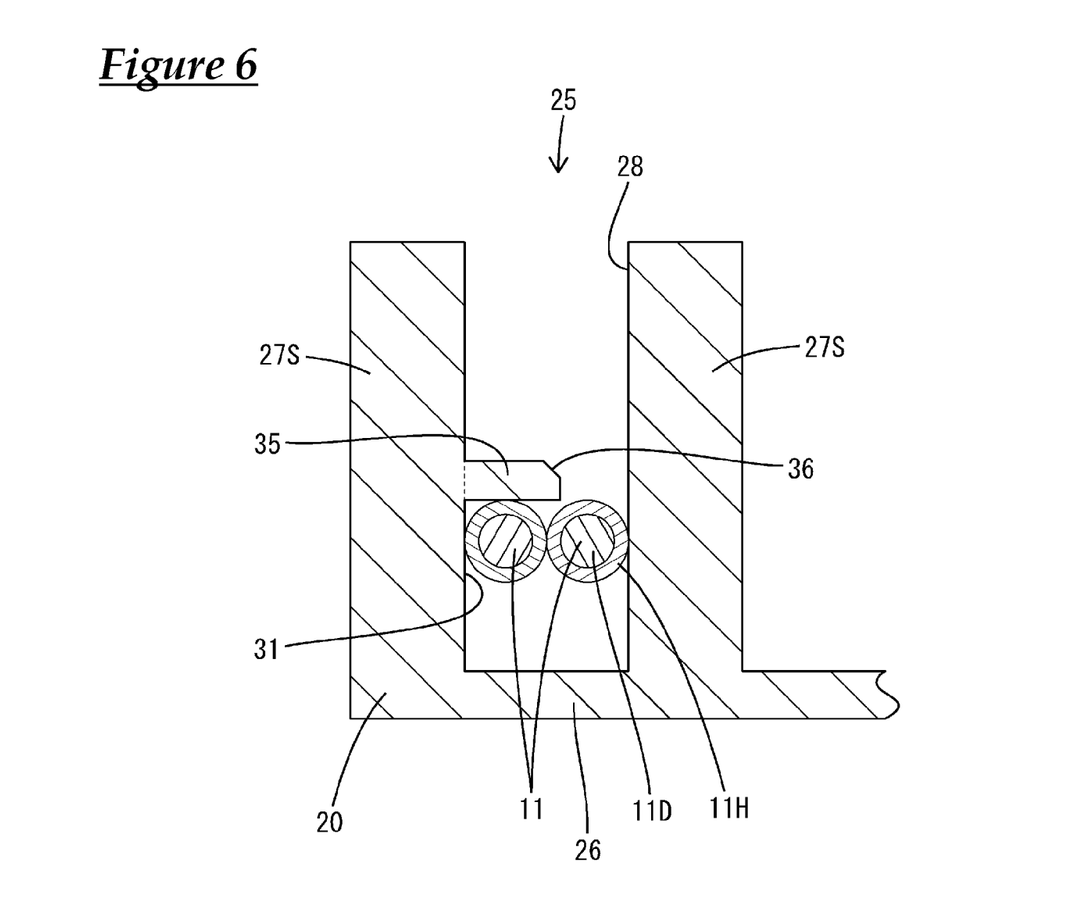
FIG. 6 is a cross-sectional view showing the insulation structure for the splice portion, and is a cross-sectional view corresponding to a cross section at a C-C position in FIG. 4.

As shown in FIG. 6, the electrical wiring housing portion 31 is provided with a coating pressing portion 35 that presses the coatings 11H of the electrical wires 11. The coating pressing portion 35 is provided so as to protrude like a cantilever from one side wall portion 27S out of the pair of side wall portions 27S. A gap that allows the electrical wires 11 that are connected by the splice terminal 13 to pass therethrough from above is provided between an end edge of the coating pressing portion 35 and the other side wall portion 27S. Note that the gap is set to be slightly narrower (by approximately the thickness of the coating 11H) than the width (the outer diameter) of one electrical wire 11.

An end edge portion of the coating pressing portion 35 is provided with a guiding portion (hereinafter referred to as a second guiding portion 36) that guides the electrical wires 11 into the electrical wiring housing portion 31. The second guiding portion 36 is an inclined surface that is formed on the upper surface side of the end edge portion of the coating pressing portion 35, and is inclined downward toward the end edge of the coating pressing portion 35. Note that the coating pressing portion 35 protrudes from the side wall portion 27S slightly further than the terminal pressing portions 33 (see FIG. 3).

Next, an example of the task of insulating the splice portions 14 will be described.

A splice terminal 13 and electrical wires 11 are orientated so as to be housed in a splice housing portion 29 and an electrical wiring housing portion 31, respectively, and thus a splice portion 14 is housed in a splice holding portion 25. At this time, the splice terminal 13 passes relatively smoothly between a pair of terminal pressing portions 33 so as to be housed in the splice housing portion 29, due to the inclination of the first guiding portions 34 of the pair of terminal pressing portions 33. Also, electrical wires 11 pass relatively smoothly through a gap between a coating pressing portion 35 and a side wall portion 27S so as to be housed in the electrical wiring housing portion 31, due to the inclination of the second guiding portion 36 of the coating pressing portion 35.

The splice portion 14 that is housed in the splice holding portion 25 is insulated by being surrounded by the bottom wall 26 and the peripheral walls 27, and is restricted from becoming separated from the opening portion 28 by the pair of terminal pressing portions 33 jutting over the splice terminal 13 and the coating pressing portion 35 jutting over the electrical wires 11.

Thus, the task of housing a splice portion 14 in a splice holding portion 25 is performed for each splice portion 14, and consequently the task of insulating the splice portions 14 is compete.

Note that, in the wiring unit U according to the present embodiment, two electrical wires 11 that extend from a splice holding portion 25 that is substantially parallel with a solenoid valve 41 are each bent at an approximately right angle in the vicinity of a rear end of an electrical wiring housing portion 31, and extend in directions that are different from each other by 180 degrees. Regarding two electrical wires 11 that extend from a splice holding portion 25 that is substantially orthogonal to a solenoid valve 41, one of the two electrical wires 11 is bent at an approximately right angle in the vicinity of a rear end of an electrical wiring housing portion 31, and the other extends straight along the harness wall portion 22.

Next, the actions and effects of the embodiment that has the above-described configuration will be described.

In an insulation structure for a splice portion 14 according to the present embodiment, an opening portion 28 that allows the splice portion 14 to be inserted thereinto and removed therefrom is formed in a splice housing portion 29 that surrounds and insulates the splice portion 14, and the insulation structure is provided with a separation restricting portion 32 that restricts the splice portion 14 that is housed in the splice housing portion 29 from becoming separated from the opening portion 28.

With this configuration, it is possible to hold and insulate the splice portion 14 within the splice housing portion 29 by simply performing the task of housing the splice portion 14 in the splice housing portion 29. Therefore, it is possible to reduce labor-hours that are required when insulating the splice portion 14, compared to cases where a tube, a tie band, or the like is used.

Also, the insulation structure for the splice portion 14 is provided with an electrical wire housing portion 31 that is formed to be narrower in width than the splice housing portion 29 and houses the electrical wires 11. With such a configuration, it is possible to restrict the electrical wires 11 from swinging, and thus it is possible to prevent the electrical wires 11 from breaking in the vicinity of a base of the splice terminal 13.

Also, the electrical wire housing portion 31 is provided with a coating pressing portion 35 that presses coatings 11H of the electrical wires 11. With such a configuration, the electrical wires 11 are pressed by the coating pressing portion 35, and therefore it is possible to more reliably prevent the electrical wires 11 from breaking in the vicinity of the base of the splice terminal 13.

Other Embodiments

The present invention is not limited to the embodiment that has been described above with reference to the drawings, and, for example, the following embodiments are also included in the technical scope of the present invention.

Although each coating pressing portion 35 in the above-described embodiment protrudes from only one side wall portion of a pair of side wall portions 27S, this is not essential. It is possible that each coating pressing portion is provided on both of a pair of side wall portions, and it is also possible that a plurality of coating pressing portions are provided in the front-rear direction.

Although each separation restricting portion 32 in the above-described embodiment includes a pair of terminal pressing portions 33, this is not essential. It is possible that each separation restricting portion includes only one terminal pressing portion, or three or more terminal pressing portions, and it is also possible that a plurality of terminal pressing portions are provided in the front-rear direction.

Although the terminal pressing portions 33 in the above-described embodiment are provided on the side wall portions 27S, this is not essential, and the terminal pressing portions may be provided on the front wall portions.

Although each separation restricting portion 32 in the present embodiment includes terminal pressing portions 33, this is not essential. The separation restricting portion may have any configuration as long as it can restrict a splice portion from becoming separated from an opening portion. For example, each separation restricting portion may have a lid portion that is coupled to a splice housing portion using a hinge and can open and close an opening portion.

Although the above-described embodiment illustrates the positions, the orientation, and the number of the splice holding portions 25, these may be freely changed.

Although the above-described embodiment describes a case where the device 40 is a control unit for an automatic transmission, this is not essential. The present invention is also applicable to a wiring unit that is to be attached to other devices.

Although the above-described embodiment describes a case where the splice holding portions 25 that include the insulation structures for the splice portions 14 are provided as portions of the harness mounting plate 20, this is not essential. The splice holding portions that include the insulation structures for the splice portions may be formed as independent parts.

Although the splice terminals 13 are crimped onto terminal portions of the electrical wires 11 in the above-described embodiment, this is not essential. For example, intermediate portions of the electrical wires, which are not terminal portions, may be connected by the splice terminals. Alternatively, a terminal portion of one electrical wire and an intermediate portion of another electrical wire, out of the plurality of electrical wires, may be connected. If this is the case, electrical wire housing portions may be provided on both of the front and rear sides of each splice housing portion.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

U: Wiring Unit
11: Electrical Wire
11H: Coating
13: Splice Terminal
14: Splice Portion
20: Harness Mounting Plate
21: Harness Mounting Portion
28: Opening Portion
29: Splice Housing Portion
31: Electrical Wire Housing Portion
32: Separation Restricting Portion
35: Coating Pressing Portion

The invention claimed is:

1. An insulation structure for a splice portion where a plurality of electrical wires are connected by a splice terminal, comprising:
a splice housing portion having a pair of side wall portions and an opening portion that allows the splice portion to be inserted thereinto and removed therefrom, the pair of side wall portions are separated by a width of the splice housing portion, the splice housing portion surrounds and insulates the splice portion;
a separation restricting portion that restricts the splice portion that is housed in the splice housing portion from becoming separated from the opening portion; and
an electrical wire housing portion having a pair of side wall portions, the pair of side wall portions are separated by a width of the electrical wire housing portion, the electrical wire housing portion houses the electrical wires, wherein the width of the electrical wire housing portion is narrower than the width of the splice housing portion.

2. The insulation structure for the splice portion according to claim 1,
wherein the electrical wire housing portion is provided with a coating pressing portion that presses coatings of the electrical wires.

3. A harness mounting plate that is formed using an insulative material, comprising:
a splice holding portion that includes:
a splice housing portion that includes a pair of side wall portions and an opening portion that allows a splice portion where a plurality of electrical wires are connected by a splice terminal to be inserted thereinto and removed therefrom, the pair of side wall portions are separated by a width of the splice housing portion, and the splice housing portion surrounds and insulates the splice portion;
a separation restricting portion that restricts the splice portion that is housed in the splice housing portion from becoming separated from the opening portion; and
an electrical wire housing portion that includes a pair of side wall portions, the pair of side wall portions are separated by a width of the electrical wire housing portion, and the electrical wire housing portion houses the electrical wires, wherein the width of the electrical wire housing portion is narrower than the width of the splice housing portion; and
a harness mounting portion on which a wire harness that includes the electrical wires is to be mounted, wherein the splice portion is provided as a portion of the harness mounting plate.

4. The harness mounting plate according to claim 3, to be attached to an automatic transmission.

5. A wiring unit comprising:
a wire harness that includes the electrical wires; and
the harness mounting plate according to claim 3.

* * * * *